ary headers omitted>

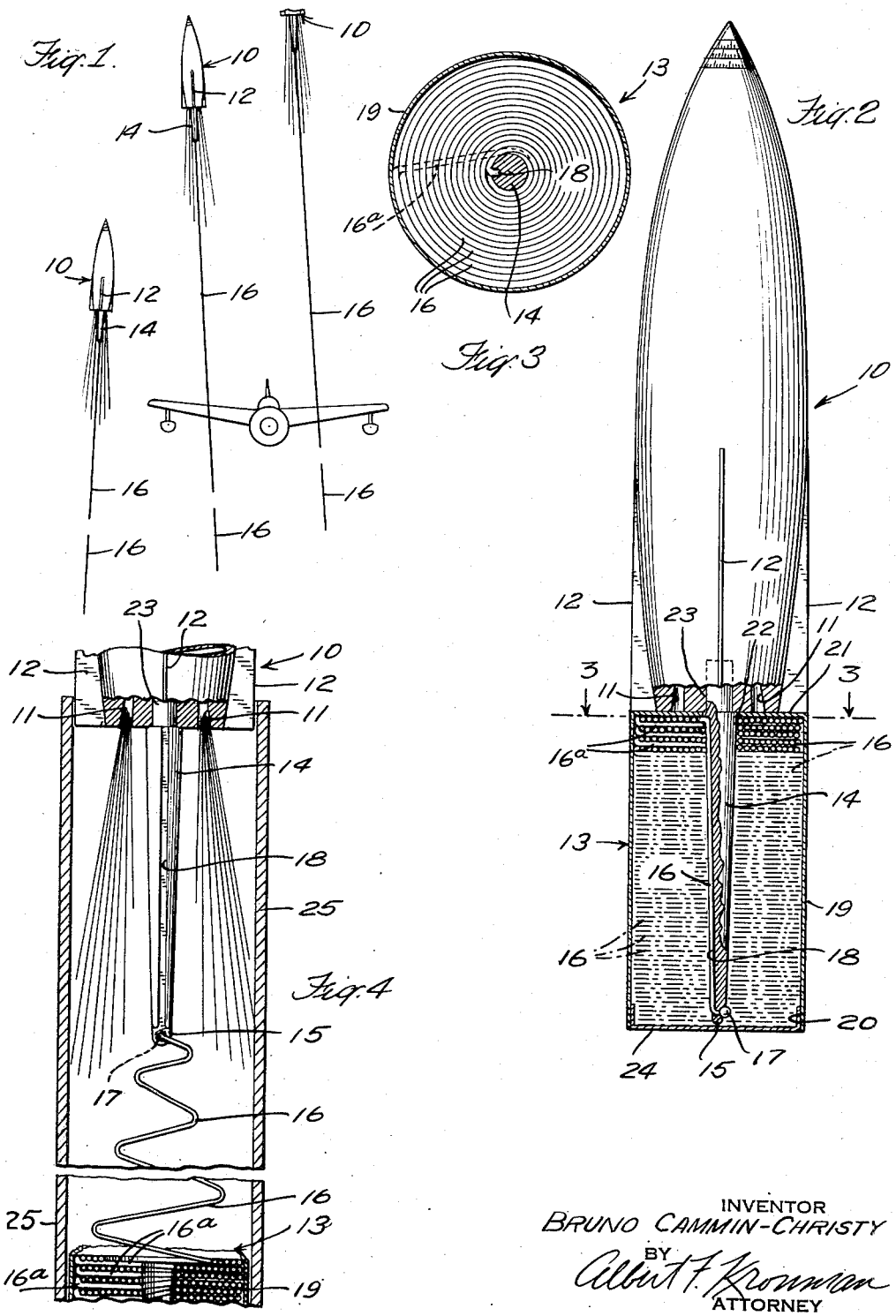

2,805,622
ROCKET MISSILES

Bruno Cammin-Christy, New York, N. Y., assignor of twenty-five percent to John Radtke, Columbia Heights, twenty-five percent to John Joseph Radtke, Queens Village, and fifteen percent to August Radtke, Valley Stream, N. Y.

Application August 9, 1954, Serial No. 448,559

2 Claims. (Cl. 102—63)

This invention relates to anti-aircraft missiles and more particularly to a ground-to-air rocket projectile.

Attacking aircraft employ what is termed "evasive action" when confronted with anti-aircraft fire. This "evasive action" comprises abrupt deviations from the line of flight and rapid changes in altitude. The employment of "evasive action" has proven to be relatively successful, even as against radar controlled anti-aircraft fire. Of course, the greater number of anti-aircraft batteries positioned in and around a target area the less effectively will attacking aircraft be able to avoid ground-to-air fire.

Balloons from which cables are suspended, called "barrage balloons," have been employed against aircraft, but they are only effective against relatively low flying planes.

To adequately protect a target area from bombing by conventional means entails tremendous cost.

Accordingly, it is an object of this invention to provide a rocket type anti-aircraft missile which minimizes the effectiveness of "evasive action" by attacking aircraft.

Another object of the present invention is to provide a rocket missile for anti-aircraft purposes which is inexpensive to fabricate and eliminates the highly expensive anti-aircraft devices presently employed for the protection against attacking planes.

A feature of this invention is the metal line or cable which is carried by the rocket. This line or cable when extended presents to attacking aircraft a difficult obstacle to avoid, thereby minimizing the effectiveness of "evasive action."

Another feature of the present invention is the tapered shaft secured to the rocket to which one end of a metal line or cable is anchored.

A further feature of this invention is the method by which the line or cable is coiled to form a compact unit capable of being unwound with a minimum of resistance and without binding.

A still further feature of this invention is the cable housing which is formed of a readily combustible material which prevents the cable or line from uncoiling, protects the line against rusting, and upon firing of the rocket burns away in the rocket launching tube.

The invention consists of the construction, combination and arrangement of parts, as herein illustrated, described and claimed.

In the accompanying drawings, forming a part hereof is illustrated one form of embodiment of the invention, in which drawings similar reference characters designate corresponding parts, and in which:

Figure 1 is a schematic showing of three rocket missiles according to this invention in flight.

Figure 2 is a side view in elevation of the rocket missile according to this invention with the cable housing and the rearmost part of the rocket shown in section.

Figure 3 is a section taken on line 3—3 of Figure 2 looking in the direction of the arrows, somewhat enlarged.

Figure 4 is a fragmentary view in section showing the rocket immediately after firing and before fully leaving the launching tube.

Referring to the drawing, and specifically Figure 2, 10 designates a rocket missile of substantially conventional construction having a fuse, timing mechanism, explosive charge, and rocket fuel therein. The rear of the rocket 10 is provided with a plurality of peripherally disposed exhaust ports 11. Four fins 12 are provided at the rear portion of the rocket 10 to stabilize the rocket while in flight. A coiled cable assembly 13, hereinafter more fully described, is secured to the rear of the rocket 10, by means of a tapered pin or shaft 14.

The tapered shaft 14 is axially secured to the rear of the rocket 10 as by threading one end of said shaft therein, welding, or by any other suitable means. The portion of the shaft 14 extending from the rocket 10 is rearwardly tapered, for a hereinafter explained purpose. At the end of the shaft 14 is formed an eye 15 to which a metal line 16, hereinafter referred to as a cable, is anchored. The anchoring of the cable 16 to the shaft 14 may be accomplished by welding a bead 17 to the cable 16 after it has been passed through the shaft eye 15. The characteristics of the cable or line 16 will be discussed hereinafter at greater length. A longitudinal groove 18 is provided in the shaft 14 from the eye 15 to the point where the shaft enters the rear of the rocket 10, as is best shown in Figure 4.

The cable 16 is wound in horizontal layers about the shaft 14 after first running that portion of the cable 16 immediately adjacent the eye 15 within the shaft groove 18. The groove 18 permits the cable 16 therein to lie below the surface of the shaft 14 so that a substantially circular coiled cable assembly 13 may be formed (see Figure 3). After the cable 16 leaves the upper end of the groove 18 it is spirally wound about the shaft 14 in a helically wound layer. Upon completion of the outermost coil of the layer the cable 16 is fed under the first layer and is directed inwardly, as shown at 16a, to the shaft 14. The cable 16 is again helically wound outwardly from the shaft 14 until the last coil in the second layer is formed. As before, the cable 16 is then led under the second layer of coils and is again spirally wound about the shaft 14 to form a third layer. This winding procedure is followed until the entire length of cable 16 is coiled in a complete cylindrical form, as shown in Figure 2. Since the portion of the cable 16 running longitudinally of the shaft 13 rests within the groove 18, the coil assembly 13 has a substantially circular configuration, as shown in Figure 3. The diameter of the coil assembly is preferably slightly smaller than the largest cross sectional diameter of the rocket 10. This size coil assembly 13 permits maximum cable length and allows the assembly 13 to snugly fit within a launching tube 25. It is also preferred that the cable 16 be wound around shaft 14 before the shaft is secured to the rocket 10.

After the cable 16 has been completely coiled, in accordance with the foregoing description, a housing 19 is slipped over the coils. The housing 19 comprises a hollow cylinder having an open end 20 and an end wall 21. End wall 21 is provided with a central opening 22 adapted to receive therethrough the rocket end portion 23 of the shaft 14. An end cover 24 is secured in any suitable manner to the housing 19 within the open end 20.

The cover 24 seals the housing 19 thereby preventing rusting of the cable 16 during storage or shipment and the penetration therein of foreign matter, such as dust and grime.

The housing 19 is preferably of a readily combustible material, such as heavy gage Celluloid. The purpose of constructing the housing of a readily combustible material is to permit the reuse of the rocket tube after the firing of the first rocket. A housing of metal or other noncombustible material is likely to be deformed by the rocket "blast" to the extent that it will be wedged therein so that it cannot be removed. When the rocket 10 is fired, by means of the conventional electrical trigger circuit, the rocket exhaust gases ignite the housing 19. The housing 19 burns away in the launching tube 25, partially shown in Figure 4, so that another rocket may be inserted therein without first removing the housing of the preceding rocket.

For convenience in manufacture, storage and handling, the coil and shaft assembly, above described, may be secured to the rocket 10 only after delivery to the launching site.

The unwinding of the cable coil 13 is shown in Figure 4 shortly after the firing of the rocket 10. When the rocket 10 is fired the exhaust gases emitted from the ports 11 exert a force against the top of the cable assembly 13. At the same time the rocket gases force the rocket 10 out of the launching tube 25, thereby withdrawing shaft 14 from the cable assembly 13. As the rocket gains altitude the cable 16 is unwound layer by layer from the topmost layer of coils to the bottom coil of the cable. Since the shaft 14 is tapered there is no binding of the coils against the shaft 14 nor binding of the coils one against the other. The horizontal winding of the cable 16, as described in detail above, permits unrestricted uncoiling, thereby minimizing the drag upon the rocket 10 during the unwinding phase of its operation.

It is within the contemplation of this invention to employ wire line of the type commonly referred to as "piano wire"; a woven wire, such as "picture wire" or small gage cable, such as described in Patent No. 2,373,364, having 50% life.

In flight the cable 16, of any of the aforementioned types, will be carried aloft, as shown in Figure 1. The high speed of the rocket 10 will maintain the cable 16 substantially taut. The length of cable 16 is governed by the size (calibre) of the rocket and the gage of the cable employed. In order to effectively damage and disable an aircraft it is not necessary to employ extremely heavy cable. A relatively light cable is sufficient to cause considerable damage. A substantial length of cable sufficient to render changes in altitude by aircraft ineffectual, may be carried by the rocket without appreciably affecting the accuracy or the range of the rocket 10.

It is understood that one such rocket according to this invention is no more effective against aircraft than conventional anti-aircraft weapons. However, salvo type of fire of the rockets of this invention will produce a veritable curtain of cables 16 in the path of oncoming aircraft, thereby rendering evasive maneuvers virtually ineffectual.

Further, it is contemplated and within the scope and spirit of this invention to use the shaft 14 as a trigger so as to explode the rocket 10 when an aircraft striking the line 16 creates a pull thereon.

From the foregoing description it can be readily seen that a ground-to-air rocket missile has been provided which will greatly reduce the effectiveness of evasive maneuvers executed by attacking aircraft. It is a weapon inexpensive to fabricate and which may be fired from an inexpensive launching device.

Having thus fully described the invention, what is claimed as new and desired to be secured by Letters Patent of the United States is:

1. An anti-aircraft rocket missile comprising, a rocket portion, a rear wall on said rocket portion, a plurality of peripherally disposed rocket exhaust ports within said rear wall, a shaft axially secured to said rear wall and extending rearwardly therefrom a substantial distance, a line of substantial length secured at one end thereof to said shaft, said line being wound about said shaft, a housing of a readily combustible material overlying the coiled line, and means including the thrust of rocket exhaust gases whereby the line may be withdrawn from the housing upon firing of the rocket.

2. An anti-aircraft rocket missile comprising, a rocket portion, a rear wall on said rocket portion, a plurality of peripherally disposed rocket exhaust ports within said rear wall, a rearwardly tapered shaft axially secured to said rear wall and extending rearwardly therefrom a substantial distance, a line of substantial length secured at one end thereof, a line securing member provided at the end of said shaft to receive the end of the line, a longitudinal groove in said shaft adapted to receive that portion of the line from the anchored end thereof to a point adjacent the rocket rear wall, said line being helically wound in horizontal layers of a diameter slightly less than the largest diameter of the rocket about said shaft, a housing of a readily combustible material overlying the coiled line, and means including the thrust of rocket exhaust gases whereby the line may be withdrawn from the housing upon firing of the rocket.

References Cited in the file of this patent

UNITED STATES PATENTS

| | | |
|---|---|---|
| 395,881 | Cunningham | Jan. 8, 1889 |
| 2,269,900 | Bickel | Jan. 13, 1942 |